United States Patent [19]

Toyoda et al.

[11] Patent Number: 4,938,892
[45] Date of Patent: Jul. 3, 1990

[54] SENSOR ELEMENT FOR DETECTING TEMPERATURE AND MOISTURE

[75] Inventors: Tatsuo Toyoda, Nagoya; Nobuyasu Kimura, Haguri, both of Japan

[73] Assignee: Aisin Seiki Kabushiki Kaisha, Kariya, Japan

[21] Appl. No.: 212,180

[22] Filed: Jun. 27, 1988

[30] Foreign Application Priority Data

Jun. 27, 1987 [JP] Japan .................. 62-160606

[51] Int. Cl.$^5$ .............................................. H01B 1/06
[52] U.S. Cl. ................................... 252/520; 252/518; 423/593; 423/598; 501/136; 501/138
[58] Field of Search ............... 423/593, 598; 252/518, 252/520, 62.3 BT; 501/136, 138

[56] References Cited

FOREIGN PATENT DOCUMENTS 56-58202 5/1981 Japan .

Primary Examiner—Josephine Barr
Attorney, Agent, or Firm—Burns, Doane, Swecker & Mathis

[57] ABSTRACT

A sensor element for detecting temperature and moisture. The sensor element has a composition of $$(Ba_{1-k}Sr_k)(Ti_{1-(1+m)}Sn_lZr_m)O_3 + xTiO_2$$

wherein $0 < k \leq 1$, $0 \leq l \leq 1$, $0 \leq m \leq 1$, $1 + m \neq 0$ and x is between 0.5 wt % and 7 wt %. The composition also provides for improved sensitivity to temperature because the Curie point of the sensor element is shifted down by the use of at least two elements selected from Sr, Sn and Zr. The presence of $TiO_2$ amplifies sensitivity against moisture variation and inhibits grain growth.

6 Claims, 1 Drawing Sheet

SENSOR ELEMENT FOR DETECTING TEMPERATURE AND MOISTURE

BACKGROUND OF THE INVENTION

The present invention relates to a sensor element for detecting temperature and moisture, which can be used, for example, in an air conditioner to control the temperature and moisture of air.

It is well known in the art that temperature and moisture variations may be detected by a single sensor element. For example, Japanese Laid-Open Pat. No. 58202/1981, published May 21, 1981, discloses such a sensor element which consists of:

$$Ba_{0.5}Sr_{0.5}TiO_3 + MgCr_2O_4$$

In this sensor element, temperature variation is defined in terms of permittive variation of the sensor element, while moisture variation is defined as the resistive variation of the element.

In the above composition, Sr is present in order to shift the Curie point Tc, while $MgCr_2O_4$ is added in order to amplify sensitivity to moisture variation. The Curie point Tc of the sensor element is established at 10° C. to 50° C. below the lowest temperature required for detection by the sensor element. Then the temperature variation is detected by measuring permittivity in the paraelectric range of the sensor element.

The above sensor element has the following drawbacks:

(a) In the above composition, the Curie point Tc is shifted down by the single element Sr. Because of this, the permittive variation becomes somewhat insensitive to temperature variation. More particularly, if the Curie point Tc is established below $-30°$ C. (i.e., $Tc \leq -30°$ C.), the temperature variation cannot be detected accurately.

(b) In the above composition, no inhibitors are included for inhibiting grain growth. Accordingly, grain growth occurs easily, therefore sensitivity against the temperature and moisture variations is poor, and changes on standing are large.

(c) In the above composition, the sensor element has high resistivity.

SUMMARY OF THE INVENTION

Accordingly, one of the objects of the present invention is to produce a sensor element to obviate the above drawbacks.

Another object of the invention is to produce a sensor element which is sensitive against both temperature and moisture variations.

Still another object of the invention is to produce a durable sensor element having little or no changes on standing.

To achieve the above objects, and in accordance with the principles of the invention as embodied and broadly described herein, the sensor element for detecting temperature and moisture comprises:

$$(Ba_{1-k}Sr_k)(Ti_{1-(l+m)}Sn_lZr_m)O_{3\ ps}$$
wherein $0 < k \leq 1$, $0 \leq l \leq 1$, $0 \leq m \leq 1$ and wherein $l + m \neq 0$ In the above composition, the Curie point of the sensor element is shifted down by at least two elements selected from Sr, Sn and Zr. The sensitivity against the temperature variation is amplified by the presence of at least two elements selected from Sr, Sn and Zr.

Preferably, from about 0.5 wt % to about 7 wt % of $TiO_2$ is further mixed into the above sensor element. The $TiO_2$ amplifies the sensitivity against moisture variation and also it inhibits grain growth.

BRIEF DESCRIPTION OF THE DRAWING

For a full understanding of the true scope of the invention, the following detailed description should be read in conjunction with the drawing, wherein.

DETAILED DESCRIPTION OF THE PREFERRED EMBODIMENTS

Figure 1:
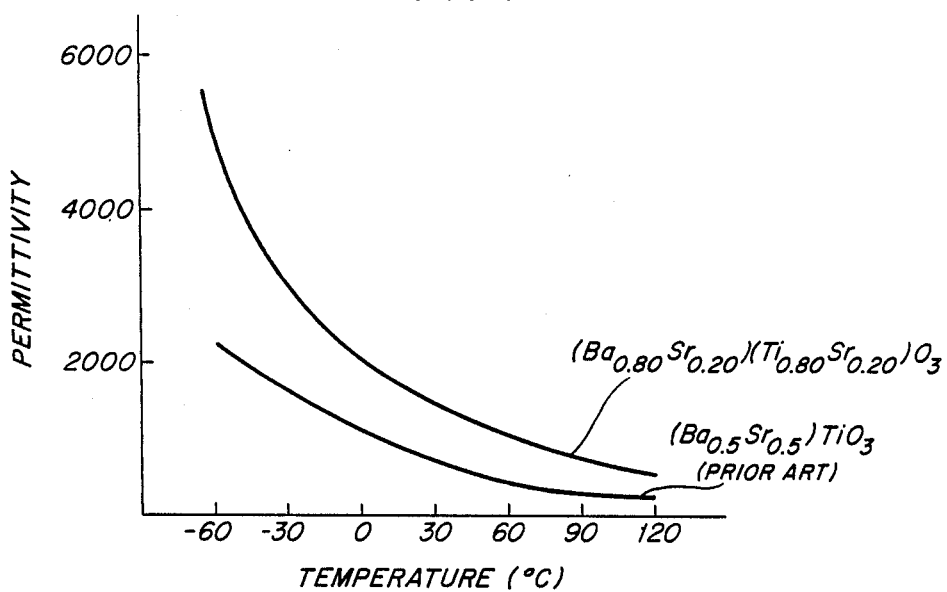
FIG. 1 is a plot of permittivity vs. temperature for one embodiment of the sensor element of the invention.

A process for producing a sensor element for detecting temperature and moisture, in accordance with one embodiment of the invention, is as follows.

The sensor element of this embodiment has a final composition after sintering as follows:

$$(Ba_{1-k}Sr_k)(Ti_{1-(l+m)}Sn_lZr_m)O_3 + xTiO_2$$

wherein l, k and m are as previously defined and x is weight percent of between about 0.5 and about 7.

To produce the above composition, a plurality of shifters and an inhibitor are added into a dielectric substance. Pure $BaTiO_3$ has a Curie point Tc of about 120° C. (i.e. $Tc = 120°$ C.). Therefore, pure $BaTiO_3$ can only detect temperatures over about 130° C. The shifters which shift down the Curie point Tc of $BaTiO_3$ are well known and include Sr, Sn, Zr, etc. The effect on Tc of these shifters is established by each shifter's specific ionic radii and valency in a solid solution structure of $BaTiO_3$.

One of the methods for producing the sensor element is as follows:

(a-1) Starting materials for producing at least two of shifters selected from Sr, Sn and Zr are mixed with the other starting material for producing $BaTiO_3$. Thus, a base material for producing the sensor element is prepared.

(a-2) $TiO_2$ is then added to the base material. The added $TiO_2$ is the dielectric substance which functions as the inhibitor and dryer.

(a-3) The base material with $TiO_2$ is calcined in order to produce a solid solution reaction product. After calcining, the base material with $TiO_2$ is sintered to produce the sensor element.

Another method for producing the sensor element is as follows:

(b-1) A chemical compound which includes at least two kinds of shifters is produced. Such chemical compounds are well known and include $SrSnO_3$, $SrZrO_3$ and generally encompass $Sr(Sn_{1-y}Zr_y)O_3$, where $0 < y < 1$.

(b-2) A base material is prepared by mixing the chemical compound of (b-1) with $BaTiO_3$ to produce a base material.

(b-3) The base material is then calcined in order to produce a solid solution reaction product. After calcining, the base material is sintered to produce the sensor element.

The following examples illustrate the invention in greater detail. It is to be understood that the invention is not limited by the specific embodiments in the examples.

EXAMPLE 1

The base material is prepared in order to produce a final composition of $(Ba_{0.80}Sr_{0.20})(Ti_{0.80}Sn_{0.20})O_3$ wherein the Curie point was established at $-60°$ C. Then, $TiO_2$ was added to separate samples of the base material in amounts of 0.5, 1, 3, 4, 5, 6 and 7 wt % and the samples were each mixed with a ball mill for 50 hours. After mixing, the base material with $TiO_2$ was in each case sintered to produce the sensor element.

The above-produced sensor element can detect temperature within the range of $-30°$ C. to $120°$ C., and also can detect moisture within the range of 0% to 100%. Further, this sensor element shows a larger and more liner permittive variation against the temperature variation than does a prior art sensor element of $(Ba_{0.5}Sr_{0.5})TiO_3$. Also, the sensor element of the invention shows a lower and more liner resistive variation than the prior art sensor element against moisture variation.

FIG. 1 illustrates the increased permittivity obtained with the sensor of Example 1 as compared to the prior art sensor. With the sensor of the present invention, the slope of the permittivity curve is steeper when compared to a typical prior art sensor.

Figure 2:
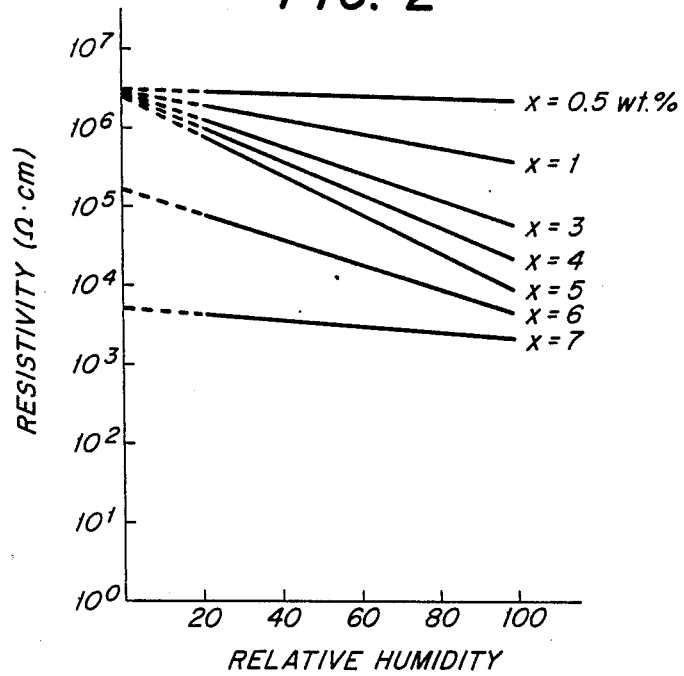
FIG. 2 is a plot of resistivity vs. relative humidity for the sensor element.

FIG. 2 illustrates the effect of varying the amount of $TiO_2$ in the sensor. Note that when x is in the range of 0.5 to 7 wt % $TiO_2$ resistivity varies as a function of humidity to a greater extent than outside the range.

EXAMPLE 2

A base material is prepared in order to produce the final composition $(Ba_{0.76}Sr_{0.24})(Ti_{0.76}Zr_{0.24})O_3$. Then, 0.5 wt % to 7 wt% of $TiO_2$ is added to the base material, and $TiO_2$ is mixed with the base material using a ballmill for 50 hours. After mixing, the base material with $TiO_2$ is calcined and sintered.

As in Example 1, this sensor element shows improved characters against temperature and moisture variations.

In both sensor elements according to Examples 1 and 2, resistance of the sensor element is apt to be increased, and the permittive variation is apt to be decreased, when the added $TiO_2$ is below about 0.5 wt %. Likewise, the grain growth cannot be inhibited sufficiently when the amount of added $TiO_2$ is below 0.5 wt %. In both sensor elements the permittive variation is apt to be decreased if the added $TiO_2$ exceeds about 7 wt %.

Furthermore, the sensor elements according to Examples 1 and 2 have at least two kinds of shifter elements selected from Sr, Sn and Zr. These shifters and $BaTiO_3$ provide a Perovskite solid solution in which $TiO_2$ is added. Accordingly, the following advantages are realized:

(1) The Curie point Tc can be established freely. The permittive variation is large with respect to the temperature variation. Therefore, the temperature variation is detected accurately.

(2) The permittive variation is large because of the inhibited grain growth. Further, the area for moisture absorption is large. Accordingly, the sensor element becomes sensitive against moisture variation, and also obtains low resistance.

(3) The change on standing is small because of the inhibited grain growth.

The following Examples 3 and 4 demonstrate the effect on the Curie point Tc of the relative ratios of shifters.

EXAMPLE 3

A chemical compound having a composition of $(Ba_{1-a}Sr_a)(Ti_{1-a}Sn_a)O_3$ was prepared and the Curie point Tc was measured against the variation of "a". The results are summarized in Table I.

TABLE I

| a:Tc (°C.) |
|---|
| 0.25: −100 |
| 0.23: −80 |
| 0.20: −60 |
| 0.18: −40 |
| 0.16: −20 |

EXAMPLE 4

A chemical compound having a composition of $(Ba_{1-b}Sr_b)(Ti_{1-b}Zr_b)O_3$ was prepared and the Curie point Tc was measured against the variation of "b". The results are summarized in Table II.

TABLE II

| b:Tc (°C.) |
|---|
| 0.29: −100 |
| 0.26: −80 |
| 0.24: −60 |
| 0.22: −40 |
| 0.19: −20 |

As can be seen from Tables I and II, with increasing amounts of Sr and Sn, and Sr and Zr, respectively, Tc decreases. These results demonstrate the effect of using more than one shifter in decreasing Tc.

Various modifications may be made in the invention without departing from the scope or spirit of this invention.

What is claimed is:

1. A sensor element for detecting temperature and moisture comprising:

$$(Ba_{1-k}Sr_k)(Ti_{1-(l+m)}Sn_lZr_m)O_3$$

wherein $0 < k \leq 1$, $0 \leq l \leq 1$, $0 \leq m \leq 1$, and wherein $l + m \neq 0$.

2. A sensor element according to claim 1, wherein said sensor element includes from about 0.5 to about 7 wt % $TiO_2$.

3. A sensor element according to claim 2, wherein said element comprises:

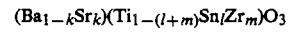

$$(Ba_{1-k}Sr_k)(Ti_{1-(l+m)}Sn_lZr_m)O_3 + xTiO_2$$

wherein $0.16 \leq k \leq 0.25$, $0.16 \leq l \leq 0.25$ and $m = 0$ and wherein x is from about 0.5 to about 7 wt %.

4. A sensor element according to claim 3, wherein $k = 0.20$ and $l = 0.20$.

5. A sensor element according to claim 2, wherein said element comprises:

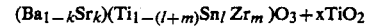

$$(Ba_{1-k}Sr_k)(Ti_{1-(l+m)}Sn_lZr_m)O_3 + xTiO_2$$

wherein $0.19 \leq k \leq 0.29$, $0.19 \leq m \leq 0.29$ and $l = 0$ and wherein x is from about 0.7 to about 7 wt %.

6. A sensor element according to claim 5, wherein $k = 0.24$ and $m = 0.24$.

* * * * *

UNITED STATES PATENT AND TRADEMARK OFFICE
CERTIFICATE OF CORRECTION

PATENT NO. : 4,938,892

DATED : July 3, 1990

INVENTOR(S) : Tatsuo TOYODA, et al.

It is certified that error appears in the above-identified patent and that said Letters Patent is hereby corrected as shown below:

On the title page:

[30] Foreign Application Priority Data

June 27, 1987 [JP] Japan .................... 62-160101

Signed and Sealed this

Eighth Day of October, 1991

Attest:

HARRY F. MANBECK, JR.

*Attesting Officer*  *Commissioner of Patents and Trademarks*